3,343,852
LOCKING NUTS AND ELECTRICAL CONNECTORS INCORPORATING LOCKING NUTS
Dennis Jack Blight, Woodford Green, Ernest Yetton, London, and John Michael Shafe, Gravesend, England, assignors to Cannon Electric (Great Britain) Limited, London, England, a British company
Filed June 8, 1964, Ser. No. 373,227
2 Claims. (Cl. 285—82)

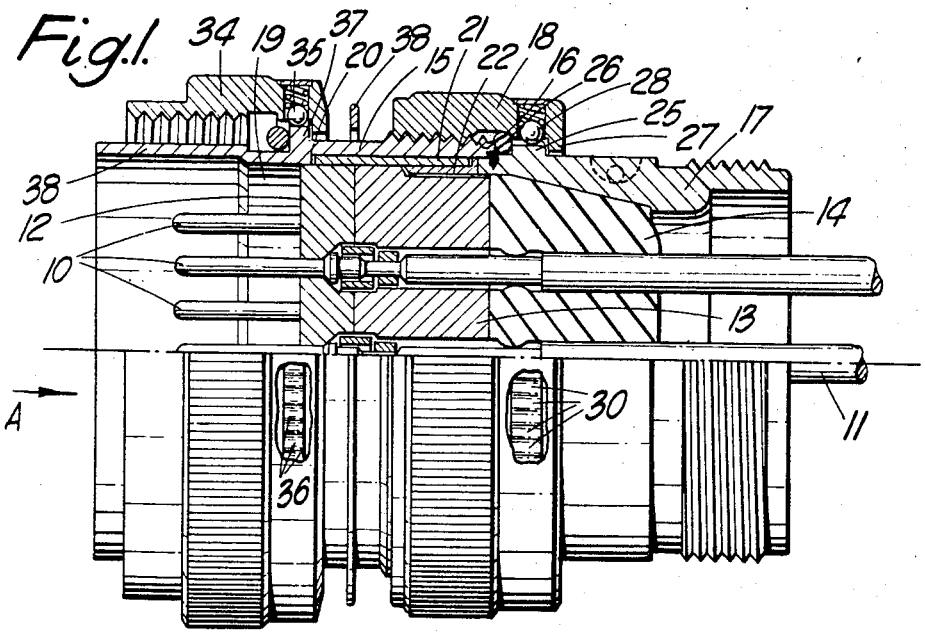
Fig.1.
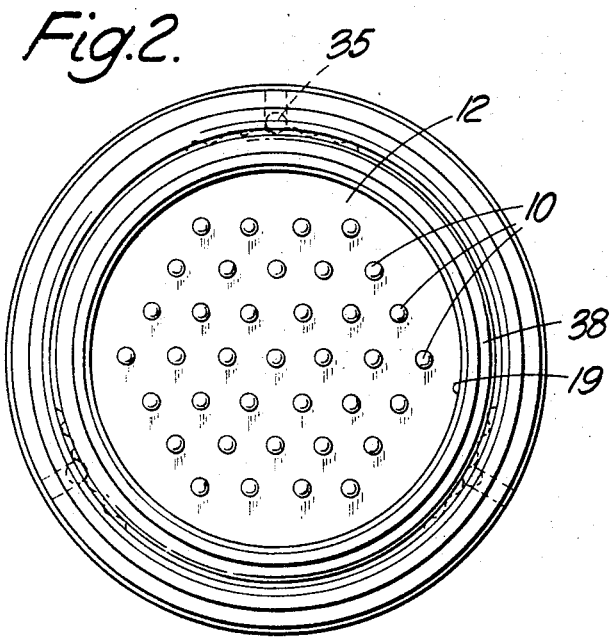
Fig.2.
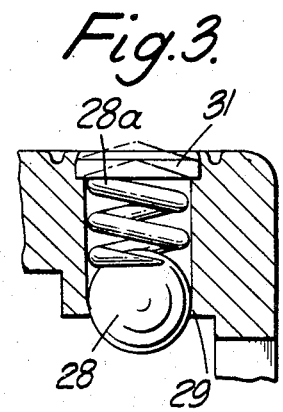
Fig.3.
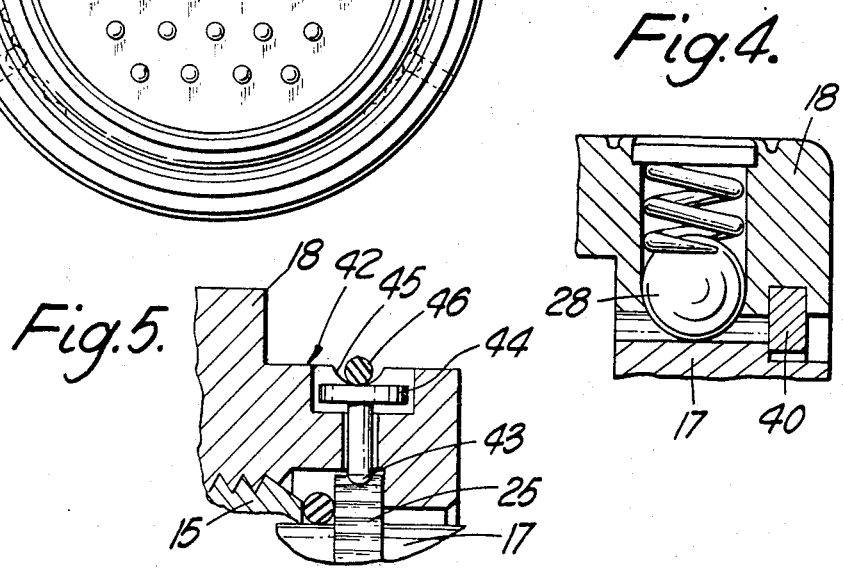
Fig.4.
Fig.5.

This invention relates to assemblies of the kind which have two parts, one of which has a screw thread, and a nut member which engages on the screw thread and draws the two parts together as it is tightened. Such an assembly will be hereinafter referred to as an "assembly of the kind described." The part which has the screw thread with which the nut engages and the other part are hereinafter respectively referred to as the "first part" and the "second part."

For many applications, an assembly of the kind described must have its nut member locked against unintentional rotation so that, after being assembled, the nut member does not slacken off due, for example, to vibrations encountered in use.

According to this invention in one aspect there is provided a nut member having a number of radially-extending bores opening to the internal surface of the nut, and a detent mounted and retained in the bore or each of the bores and projecting beyond the inner end of the bore, the detent or detents being backed by means resiliently urging it or them radially inwards. Preferably, the means resiliently urging the detent or detents inwards comprises individual coil compression springs.

According to another aspect of this invention, an assembly of the kind described is characterised by a ring, concentric with the screw thread, of indentations and at least one detent resiliently engaging in the indentations, the ring of indentations and the detent being one on the nut member and the other on one of the two parts of the assembly, so that the detent is resiliently urged into successive indentations as the nut member is tightened up to its final position.

In order to slacken off the nut member, sufficient torque must be applied to overcome the load on the detent as it passes from one indentation to the next. If this torque is greater than that which cannot be avoided in operation, e.g. that due to vibrations, the nut member is locked against unintentional rotation. Thus, the nut member can be satisfactorily locked if a suitably heavy resilient loading is applied to the detent.

According to a feature of the invention the indentations may face radially outwards and may be provided on a cylindrical portion of the second part, which portion is inside the nut member when the assembly is assembled, the indentations being distributed evenly around the circumference of the cylindrical portion.

Preferably the nut member or, as the case may be, one of the two parts of the assembly, carries a plurality of such detents evenly distributed round its circumference and individual springs for the detents, each spring urging the associated detent into resilient engagement with the indentations.

According to the invention in yet another aspect there is provided an assembly comprising a first member having an externally threaded cylindrical surface; a second member having a cylindrical surface; and a nut member comprising a nut threadable on to the thread of the first member and movable axially over the second member, the second member having a shoulder to limit relative axial movement in one direction between the nut and the second member such that rotation of the nut in one direction draws the first and second members together to a locked position relative to each other, the shoulder having an outer cylindrical surface with indentations therein, and the nut member having a radially movable member mounted in the nut member and providing a detent projecting inside the nut member and an encircling spring mounted externally on the nut member and urging the detent resiliently inwardly to engage the indentations when the first and second members are moved into the locked position.

In one arrangement the nut has an inwardly facing annular groove and a circlip mounted in and projecting inwards from the groove for engaging the shoulder on the second member to draw the first and second members together.

One embodiment of the invention will now be described by way of example with reference to the accompanying drawings in which:

FIGURE 1 shows an elevation of the assembly, the upper half of the figure being shown in axial section, FIGURE 2 shows an end elevation of the assembly viewed in the direction of the arrow A on FIGURE 1, FIGURE 3 shows a detail, FIGURE 4 shows a first detail modification, and FIGURE 5 shows a second detail modification.

Referring to the drawings there is shown one element of an electrical plug connector. The element has a large number of pin-type contacts 10 which are held in two blocks of insulating material 12, 13, and to the rearward ends of which are soldered the bared ends of respective conductors 11, The adjacent sheathed portions of the conductors extend through a rubber grommet 14. The blocks 12 and 13 of insulating material and the grommet 14 are held together by an assembly comprising a first sleeve part 15 formed at one end with an external screw thread 16, a second sleeve part 17, and a nut 18 which engages the thread 16 on the first part and which serves to hold the first and second parts together. The second part 17 has a frusto-conical internal surface which engages a corresponding surface on the rubber grommet 14 and serves to tighten the grommet on the conductors 10, as the nut is tightened.

The first part 15 has one diameter over a short middle portion 19 of its length and has a slightly larger diameter over the rearward part of its length, a rearwardly facing shoulder 20 being formed at the change of diameter. An axially extending key 21 is welded to the internal surface of the first part and extends over substantially the full length of the rear larger diameter portion. The block 12 of insulating material has a rebate in its forward edge which rebate registers with the shoulder 20, and has a keyway to accommodate the key 21. The block 13 of insulating material abuts block 12 axially and also has a keyway to accommodate key 21. The rearward end of the part of the block 13 has a reduced diameter so that an annular gap is formed between the body and the first part 15. The forward end portion of the second part projects into this gap and has a slot 22 cut in it which registers with the key 21. Key 21 thus holds sleeve parts 15, 17 and blocks 12 and 13 against relative rotation.

The second sleeve part 17 has an external flange 25 disposed adjacent the end of the first part 15, a sealing ring 26 being disposed between the flange and the adjacent end of sleeve part 15. The nut 18 has at its rearward end an inturned flange 27 which engages behind the flange 25 to draw the second part 17 towards the first part 15 as the nut is tightened.

At locations equidistantly spaced from each other three detents are mounted in the nut. As best seen in FIGURE 3 each detent comprises a ball bearing 28 mounted in a radially-extending bore in the nut, the inner end of the bore having an inturned lip 29 to retain the ball in place. The ball is resiliently urged radially inwardly by a small compression spring 28a which is seated against a cover plate 31 mounted in a counterbored radially outer portion of the bore. The cover plates 31 are made in conical or convex form as indicated in chain lines and during assembly of the nut are placed in the counterbore with bulging side outermost. The plate is then punched in the direction of arrow Y so that the cover plate is flattened and is securely held in the counterbore. The outer edge of the counterbore is then caulked as an additional safeguard.

A large number of axially extending grooves are milled across the outer surface of the flange 25 on the part 17 as shown at 30, and these grooves are resiliently engaged by the detents as the nut is tightened to its final position. The strength of the compression springs 28a is such that the vibration to which the assembly is normally subjected is not sufficient to dislodge the detents from the grooves in which they are lodged in the tightened condition of the assembly. The nut is therefore not easily shaken loose by vibration. If a sudden jolt of unusual severity slackens the nut a small amount the detents 28 will be held in further grooves, and the torque necessary to slacken the nut further will remain substantially the same.

The forward end portion of the first member 15 is encircled by a second nut 34 which is similar to nut 18 and which serves to engage a corresponding male screw thread on a connector element (not shown) which affords sockets for pins 10. The nut 34 is provided with three detents 35 similar to the detents 28 and these detents engage resiliently in axial grooves 36 similar to grooves 30 formed on an external flange 37 on the first part 15. A cadmium plated mild steel ring 38 encircles the first part 15 between nuts 34 and 18. The purpose of this ring is to permit slip between nuts 34 and 18, when the nut 34 is being loosened and comes into axial abutment, through ring 38, with nut 18. This reduces the risk of accidental slackening of nut 18 during slackening of nut 34.

The forward end portion of first part 15 has an axial slot 39 for engagement with a polarising key on the mating connector element similar to key 21.

In a modification illustrated in FIGURE 4, instead of the inturned flange 27 on nut 18, a spring circlip 40 is mounted in an inwardly facing circumferential groove in the nut and engages the rearwardly facing side of flange 25 on the second sleeve part 17.

In another modification shown in FIGURE 5, each of the detents comprises a stud 42 with a hemispherical end 43 and a head 44. The shank of the stud occupies a radial bore in the nut and the head 44 occupies an outer counterbored portion. The counterbore opens to a circumferential groove 45 which is formed in the external surface of the nut and which accommodates a spring ring 46. The ring has a gap in its circumference and the gap is disposed at a part of the groove where the sides have been deformed inward, so that the ring is circumferentially located. The ring 46 engages the heads of the studs and urges them inwards resiliently so that the hemispherical ends 43 of the studs, which project beyond the inner ends of the bores, engage in the axial grooves or indentations in the flange 25.

We claim:
1. An assembly comprising two parts adapted to be releasably connected together, a nut member for releasably connecting said parts, having a plurality of radially extending through passageways angularly spaced from one another around the circumference of the nut member, a detent carried solely by said nut member and working in a radial direction only in each of said passageways and having a substantially rounded radially inner surface, one of said parts being provided with a plurality of grooves facing in a radially outward direction only for receiving the said rounded surfaces of said detents, resilient means carried by said nut member only and working in said passageways for ever urging said rounded surfaces of the detents into said grooves so that the nut member will be restrained against unintentional rotation but can be wilfully rotated in either direction by simply rotating the nut member so that the rounded surfaces of the detents will slide over the walls of the grooves during said wilful rotation of the nut member, said passageways opening through the outer surface of the nut member to afford easy access to the passageways, the detents and the resilient means, said nut member including means for limiting the radial inward movement of the detents, and means for drawing the two parts together to a locked position relative to each other comprising an inturned flange on said nut member and a flange on one of said parts, for engagement by the flange on the nut member, the flange on said one part having said grooves formed therein, said resilient means comprising a spring ring engaging all of the detents to exert force on each of the detents.

2. An assembly comprising two parts adapted to be releasably connected together, a nut member for releasably connecting said parts and being disposed outwardly of the parts and having a plurality of radially extending through passageways angularly spaced from one another around the circumference of the nut member, a detent carried solely by said nut member and working in a radial direction only in each of said passageways and having a substantially rounded radially inner surface, one of said parts being provided with a plurality of grooves facing in a radially outward direction only for receiving the said rounded surfaces of said detents, resilient means carried by said nut member only and working in said passageways for ever urging said rounded surfaces of the detents into said grooves so that the nut member will be restrained against unintentional rotation but can be wilfully rotated in either direction by simply rotating the nut member so that the rounded surfaces of the detents will slide over the walls of the grooves during said wilful rotation of the nut member, said passageways opening through the outer surface of the nut member to afford easy access to the passageways, the detents and the resilient means, said nut member including integral means for limiting the radial inward movement of the detents, and means for drawing the two parts together to a locked position relative to each other comprising an inturned flange on the nut member and a flange on one of said parts for engagement by the flange on the nut member, the flange on said one part having said grooves formed therein, said resilient means comprising a spring ring engaging all of the detents to exert equal force on each of the detents.

References Cited

UNITED STATES PATENTS

| | | | |
|---|---|---|---|
| 562,029 | 6/1896 | Rinsche | 285—87 |
| 974,766 | 7/1905 | Wright | 285—85 |
| 975,905 | 11/1910 | Taylor | 285—91 |
| 1,289,867 | 12/1918 | Moore | 151—9 X |
| 1,467,907 | 9/1923 | Miyagi | 151—10 X |
| 2,372,888 | 4/1945 | Duggan | 151—24 X |
| 2,688,736 | 9/1954 | Simpson | 339—89 |
| 3,255,796 | 6/1966 | Tobey | 151—24 |

FOREIGN PATENTS

| | | |
|---|---|---|
| 1,221,842 | 9/1962 | France. |
| 467,544 | 10/1928 | Germany. |

CARL W. TOMLIN, Primary Examiner.

D. W. AROLA, R. GIANGIORGI, Assistant Examiners.